United States Patent
Kuroda et al.

(10) Patent No.: US 11,369,927 B2
(45) Date of Patent: Jun. 28, 2022

(54) GEL REDUCTION METHOD

(71) Applicant: Kabushiki Kaisha Kobe Seiko Sho (Kobe Steel, Ltd.), Kobe (JP)

(72) Inventors: Yoshinori Kuroda, Takasago (JP); Tsugushi Fukui, Takasago (JP); Kazuo Yamaguchi, Takasago (JP); Takaya Uda, Takasago (JP); Katsunori Takahashi, Takasago (JP); Sayaka Yamada, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 902 days.

(21) Appl. No.: 16/186,025

(22) Filed: Nov. 9, 2018

(65) Prior Publication Data

US 2019/0143564 A1 May 16, 2019

Related U.S. Application Data

(62) Division of application No. 13/823,819, filed as application No. PCT/JP2011/006232 on Nov. 8, 2011, now abandoned.

(30) Foreign Application Priority Data

Nov. 12, 2010 (JP) .................. 2010-253992
Mar. 11, 2011 (JP) .................. 2011-054230

(51) Int. Cl.
*B01F 25/452* (2022.01)
*B29B 7/32* (2006.01)
(Continued)

(52) U.S. Cl.
CPC ...... *B01F 25/4521* (2022.01); *B01F 25/4523* (2022.01); *B29B 7/325* (2013.01);
(Continued)

(58) Field of Classification Search
CPC ....... B29C 47/68; B01F 5/0604; B01F 25/422
(Continued)

(56) References Cited

U.S. PATENT DOCUMENTS 2,607,954 A 8/1952 Schneider
2,883,261 A 4/1959 McGeorge, Jr.
(Continued)

FOREIGN PATENT DOCUMENTS

GB 705196 A 3/1954
JP 52 43864 4/1977
(Continued)

OTHER PUBLICATIONS

International Search Report dated Feb. 7, 2012 in PCT/JP11/06232 Filed Nov. 8, 2011.
(Continued)

*Primary Examiner* — Marc C Howell
(74) *Attorney, Agent, or Firm* — Oblon, McClelland, Maier & Neustadt, L.L.P.

(57) ABSTRACT

A method for reducing gel in a polymer kneaded compound flowing in a polymer flow duct includes flowing a polymer kneaded compound in a polymer flow duct to a gel reduction mechanism including a gel reduction member having one or more through holes defining a squeezing flow path having a flow path cross-sectional area smaller than the polymer flow duct. The squeeze ratio S1/S2 of the squeezing flow path is 25 to 177.8, where S1 is a flow path cross-sectional area of the polymer flow duct and S2 is a sum total of flow path cross-sectional area of the squeezing flow path, to generate an extensional flow in the kneaded compound.

4 Claims, 8 Drawing Sheets

(51) Int. Cl.

| | | |
|---|---|---|
| *B29C 48/05* | (2019.01) | |
| *B29C 48/08* | (2019.01) | |
| *B29C 48/36* | (2019.01) | |
| *B29C 48/37* | (2019.01) | |
| *B29C 48/695* | (2019.01) | |
| *B29B 7/80* | (2006.01) | |
| *B29C 48/00* | (2019.01) | |
| *B29C 48/375* | (2019.01) | |
| *B29C 48/693* | (2019.01) | |
| *B29C 48/88* | (2019.01) | |

(52) U.S. Cl.
CPC ............... *B29B 7/80* (2013.01); *B29C 48/05* (2019.02); *B29C 48/08* (2019.02); *B29C 48/362* (2019.02); *B29C 48/37* (2019.02); *B29C 48/695* (2019.02); *B29C 48/022* (2019.02); *B29C 48/387* (2019.02); *B29C 48/693* (2019.02); *B29C 48/919* (2019.02); *B29C 2948/92514* (2019.02)

(58) Field of Classification Search
USPC ........................................................ 366/340
See application file for complete search history.

(56) References Cited

U.S. PATENT DOCUMENTS

| | | | |
|---|---|---|---|
| 3,197,533 A | 7/1965 | Robinson | |
| 3,526,391 A | 9/1970 | Church, Jr. | |
| 4,104,015 A | 8/1978 | Meyer | |
| 4,684,254 A | 8/1987 | Goudy, Jr. | |
| 5,730,885 A * | 3/1998 | Blakeslee | B29C 48/69 |
| | | | 210/773 |
| 7,393,916 B2 * | 7/2008 | Neubauer | C08F 6/26 |
| | | | 528/480 |
| 2003/0178740 A1 | 9/2003 | Bacher et al. | |
| 2004/0019112 A1 | 1/2004 | Maley | |
| 2007/0100132 A1 | 5/2007 | Neubauer et al. | |
| 2007/0294935 A1 | 12/2007 | Waldron | |
| 2010/0022735 A1 | 1/2010 | Kanamori | |
| 2011/0143004 A1 | 6/2011 | Wood et al. | |
| 2012/0258220 A1 | 10/2012 | Jacobson | |

FOREIGN PATENT DOCUMENTS

| | | |
|---|---|---|
| JP | 53 46362 | 4/1978 |
| JP | 8 103952 | 4/1996 |
| JP | 11 34144 | 2/1999 |
| JP | 11-34144 | 2/1999 |
| JP | 11 76721 | 3/1999 |
| JP | 11-76721 | 3/1999 |
| JP | 11 254501 | 9/1999 |
| JP | 11-254501 A | 9/1999 |
| JP | 2000 511967 | 9/2000 |
| JP | 2004-276451 | 10/2004 |
| JP | 2006-276426 A | 10/2006 |
| JP | 2010-23464 | 2/2010 |
| JP | 2012-101511 | 5/2012 |

OTHER PUBLICATIONS

Notification of Reason(s) for Refusal dated Feb. 7, 2012 in Japanese Patent Application No. 2011-054230 (with English translation).
Extended European Search Report dated Jul. 16, 2014 in Patent Application No. 11840390.6.

* cited by examiner

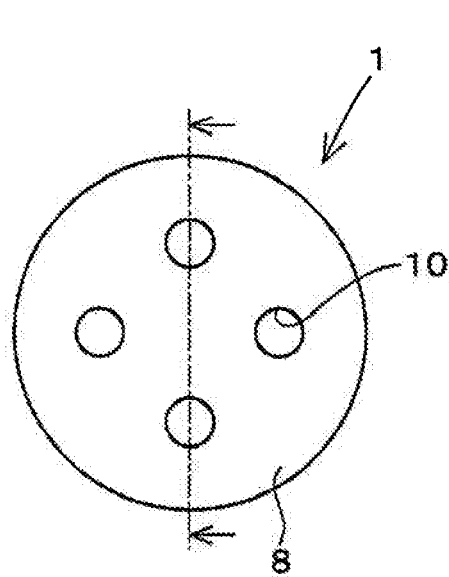
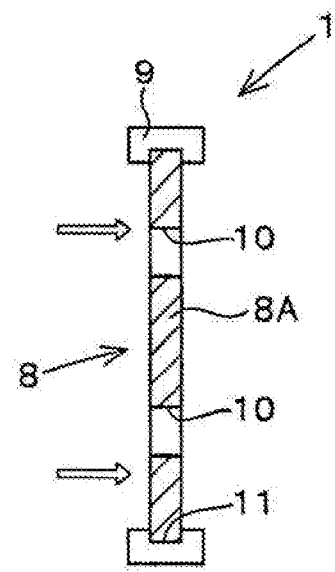
FIG. 2A  FIG. 2B
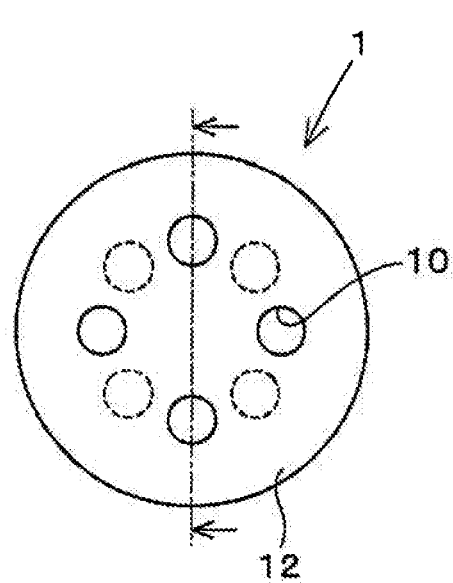
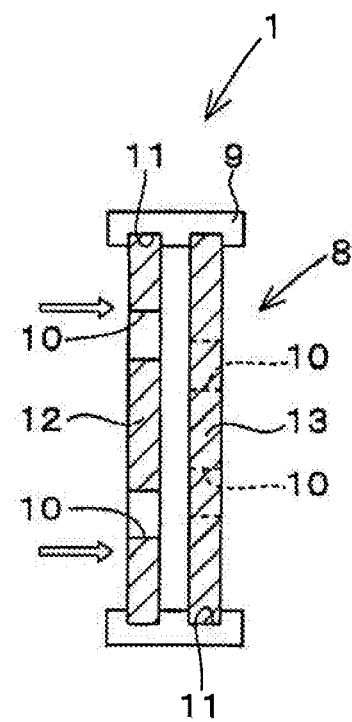
FIG. 3A  FIG. 3B

GEL REDUCTION METHOD

CROSS-REFERENCE TO RELATED APPLICATIONS

The present application is a divisional application of U.S. patent application Ser. No. 13/823,819 filed on Mar. 15, 2013, which is a national stage of PCT/JP 1/006232 filed on Nov. 8, 2011 and which claims priority under 35 U.S.C. § 119 to Japanese patent application 2010-253992 filed on Nov. 12, 2010 and Japanese patent application 2011-054230 filed on Mar. 1, 2011.

TECHNICAL FIELD

The present invention relates to a method for reducing gel present in polymer.

BACKGROUND ART

In recent years, demands, which are to melt-blend different viscosity polymers and to produce binary or multi modal polymers, have been increased in order to meet functions of final product applications. A part of a high viscosity polymer or a high molecular component becomes gels, if dispersive mixing performances of polymer melting and mixing of mixers and extruders are not sufficient to perform complete homogeneity. Gels in such a compound may result in worse appearance and may degrade mechanical properties of final products. Accordingly, gel reduction devices have been provided for mixers and extruders.

For example, a method and a device for reducing gel (removing gel) in a polymer kneaded compound using a filtration device including a filter made of a metal sintered body are proposed in patent literature 1. The filter used in this filtration device has a very small mesh size (filtration accuracy) of 1 to 100 μm and only gel can be filtered out from the polymer kneaded compound.

However, the filter provided in the filtration device of this patent literature 1 has a very small mesh size, i.e. has fine meshes. Naturally, if it is applied for filtering for the polymer kneaded compound using the fine filter, a pressure drop produced at a filtration part excessively increases and it may result in decreasing productivity due to an allowable pressure of the mixers and extruders. Particularly, in the case of filtering a high-viscosity polymer kneaded compound such as a high-density polyethylene (HDPE) applied for film grade and pipe grade, there has been a problem of particularly as a poor productivity.

On the other hand, a gel reduction device designed for more efficient filtration has been also developed as shown in patent literature 2. The gel reduction device of this patent literature 2 is for introducing a polymer kneaded compound containing gel into a slit and dispersing the gel by applying a large shear force on the gel passing through the slit.

Further, a method for reducing gel in a polyolefin polymer kneaded compound using a filtration device including a screen filter is proposed in patent literature 3. The filter used in this filtration device has a mesh size of 70 to 200 μm and is filtering gels with a filtration capability of 5 to 100 pounds per hour per square inch.

CITATION LIST

Patent Literatures

[Patent literature 1] Japanese Unexamined Patent Publication No. 2010-23464

[Patent literature 2] Japanese Unexamined Patent Publication No. 2004-276451

[Patent literature 3] Specification of U.S. Pat. No. 7,393,916

SUMMARY OF INVENTION

First Problem to be Solved by the Invention

The gel reduction device of patent literature 2 disperses the gel by applying a large shear force to the gel, and a large shear force cannot be generated on the gel unless the width of the slit is narrowed to a certain extent (0.6 mm in the disclosure of an embodiment). That is, also in the gel reduction device of patent literature 2, there is a possibility of producing an excessive pressure drop between upstream and downstream of the gel reduction device with a high production rate.

The present invention was developed to solve the above first problem and a first object thereof is to provide a gel reduction device and a gel reduction method capable of producing a polymer kneaded compound with a very low gel content with high productivity.

Second Problem to be Solved by the Invention

In the filtration device of patent literature 3, the screen filter for filtering foreign materials is converted for a gel reduction device. The screen filter in this case mainly has an ability to collect gel and a pressure drop excessively increases due to the collected gel during operation, which leads to a higher exchange frequency of the screen filter and also leads to a poor productivity.

On the other hand, as described above, the filtration device of patent literature 2 is for reducing gel by applying a large shear force onto a polymer kneaded compound passing through the slit. However, in this invention, the polymer kneaded compound passing through the filtration device has a large shear force already applied when materials are kneaded in mixers and extruders in the preceding process. Therefore, even if the method in this invention is applied for eliminating gels is in the polymer kneaded compound, there is a low possibility of sufficiently reducing the gel.

The present invention was developed to further solve the above second problem and a second object thereof is to provide a gel reduction method capable of producing a polymer kneaded compound containing few gels with high productivity.

Means for Solving the Problems

To achieve the above first object, the following technical measures are taken in a gel reduction device of the present invention.

That is, the present invention is directed to a method for reducing gel present in a polymer kneaded compound flowing in a polymer flow duct having an upstream end which is connected with a barrel through which a mixing rotor is provided and a downstream end which is attached with a die, the method comprising a step of allowing a polymer kneaded compound into the polymer flow duct from the barrel through the upstream; a step of flowing the polymer kneaded compound to a gel reduction mechanism provided in the polymer flow duct, the gel reduction mechanism including a gel reduction member having an upstream surface and a downstream surface and one or more through holes each defining a squeezing flow path having a flow path cross-sectional area smaller than the polymer flow duct, wherein a squeeze ratio S1/S2 of the squeezing flow path is set to satisfy the following relationship to generate an extensional flow in the kneaded compound flowing in the squeezing flow path: squeeze ratio S1/S2 of the squeezing flow path=25 to 177.8, where S1 is a flow path cross-sectional area of the polymer flow duct and S2 is a sum total of flow path cross-sectional area of the squeezing flow path; a step of introducing a flowing mass of the polymer kneaded compound having flowed from the upstream end to the squeezing flow path from the upstream surface under a predetermined pressure difference between an upstream side of the squeezing flow path and a downstream side of the squeezing flow path; and a step of flowing the polymer kneaded compound having flowed from the squeezing flow path to the die to outflow the polymer kneaded compound having a reduced gel through the die.

The present invention is further directed to a method for reducing gel present in a polymer kneaded compound flowing in a polymer flow duct having an upstream end which is connected with a barrel through which a mixing rotor is provided and a downstream end which is attached with a die, the method comprising a step of allowing a polymer kneaded compound into the polymer flow duct from the barrel through the upstream; a step of flowing the polymer kneaded compound from the upstream end to the downstream end by constantly applying a pressure drop of 8.8 MPaG or higher to the polymer kneaded compound containing gel at an intermediate position of the polymer flow duct.

The present invention is further directed to a method for reducing gel present in a polymer kneaded compound flowing in a polymer flow duct having an upstream end which is connected with a barrel through which a mixing rotor is provided and a downstream and which is attached with a die, the method comprising a step of allowing a polymer kneaded compound into the polymer flow duct from the barrel through the upstream; a step of flowing the polymer kneaded compound to a pressure drop adding device provided at an intermediate position of the polymer flow duct for producing a predetermined pressure drop in the polymer kneaded compound containing gel; and a step of flowing the polymer kneaded compound having flowed from the pressure drop adding device to the die to outflow the polymer kneaded compound having a reduced gel through the die, wherein a pressure drop of 8.8 MPaG or higher is constantly applied to the polymer kneaded compound by the pressure drop adding device to reduce the gel in the polymer.

BRIEF DESCRIPTION OF DRAWINGS

FIG. 2A shows a front view of a gel reduction device of a first embodiment, FIG. 2B shows a side view of a gel reduction device of a first embodiment, FIG. 3A shows a front view of a gel reduction device of a second embodiment, FIG. 3B shows a side view of a gel reduction device of a second embodiment, FIG. 4AA shows a front view of a gel reduction device of a third embodiment, FIG. 4AB shows a side view of a gel reduction device of a third embodiment, FIG. 4BA shows a front view of a variation of the gel reduction device of the third embodiment, FIG. 4BB shows a side view of the variation of the gel reduction device of the third embodiment, FIG. 4CA shows a front view of another variation of the gel reduction device of the third embodiment, FIG. 4CB shows a side view of the another variation of the gel reduction device of the third embodiment, FIG. 5AA shows a front view of a gel reduction device of a fourth embodiment, FIG. 5AB shows a side view of a gel reduction device of a fourth embodiment, FIG. 5BA shows a front view of a variation of the gel reduction device of the fourth embodiment, FIG. 5BB shows a side view of the variation of the gel reduction device of the fourth embodiment, FIG. 5CA shows a front view of another variation of the gel reduction device of the fourth embodiment, FIG. 5CB shows a side view of the another variation of the gel reduction device of the fourth embodiment, FIG. 6AA shows a front view of a gel reduction device of a modification of the fourth embodiment, FIG. 6AB shows a side view of a gel reduction device of the modification of the fourth embodiment, FIG. 6BA shows a front view of a variation of the modification of the gel reduction device of the fourth embodiment, FIG. 6BB shows a side view of the variation of the modification of the gel reduction device of the fourth embodiment, FIG. 6CA shows a front view of another variation of the modification of the gel reduction device of the fourth embodiment, FIG. 6CB shows a side view of the modification of the another variation of the gel reduction device of the fourth embodiment.

EMBODIMENTS OF INVENTION

First Embodiment

First, a mixing and extrusion equipment 2 in which a gel reduction device 1 is provided is briefly described prior to describing the gel reduction device 1 of the present invention.

Figure 1A:
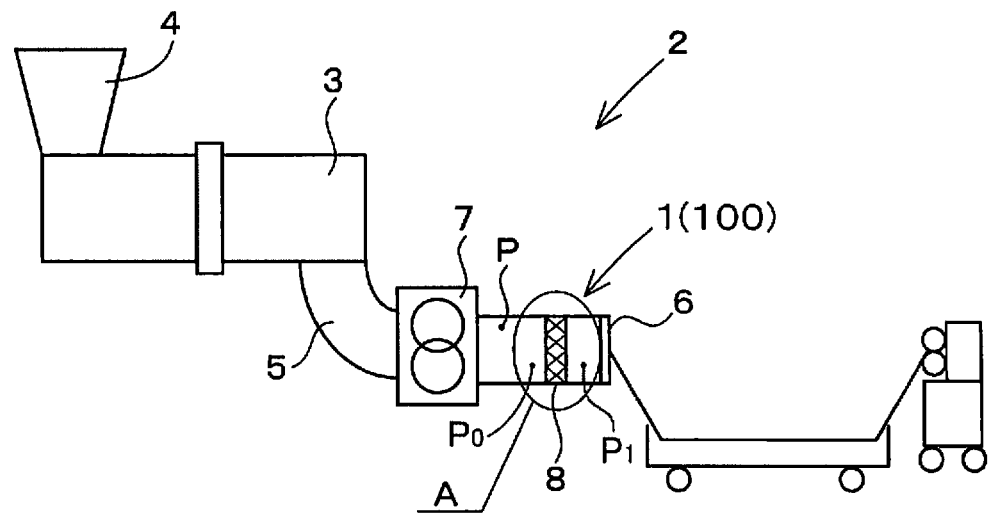
FIG. 1A is a front view of a mixing and extrusion equipment in which a gel reduction device of the invention is provided.

FIG. 1A shows an example of the mixing and extrusion equipment 2 (an example of a continuous mixer) in which the gel reduction device 1 of the present invention is provided.

The mixing and extrusion equipment 2 of the shown example is a kneader for kneading a resin material by twin mixing rotors (not shown) inserted through a barrel 3. A hopper 4 capable of feeding materials into the barrel 3 is provided at one end (left end in FIG. 1A) of this barrel 3, and a polymer flow duct 5 for discharging the kneaded resin material to the outside of the kneader is provided at the other end.

A strand die 6 for extruding the polymer kneaded compound is provided at the leading end of this polymer flow duct 5, and a gear pump 7 for pressurizing the polymer kneaded compound to the strand die 6 is arranged at an intermediate position of the polymer flow duct 5.

The gel reduction device 1 of the present invention is arranged in the polymer flow duct 5 between this gear pump 7 and the strand die 6.

The gel reduction device 1 is for reducing gel from the polymer kneaded compound flowing in the polymer flow duct 5 and includes a gel reduction mechanism 8 for reducing the gel from the kneaded compound. This gel reduction mechanism 8 reduces the gel by dispersing the gel contained in the kneaded compound by generating an extensional flow for the polymer kneaded compound.

The gel reduction mechanism 8 in various forms can be considered. The gel reduction mechanism 8 of a first embodiment is described below.

Figure 1B:
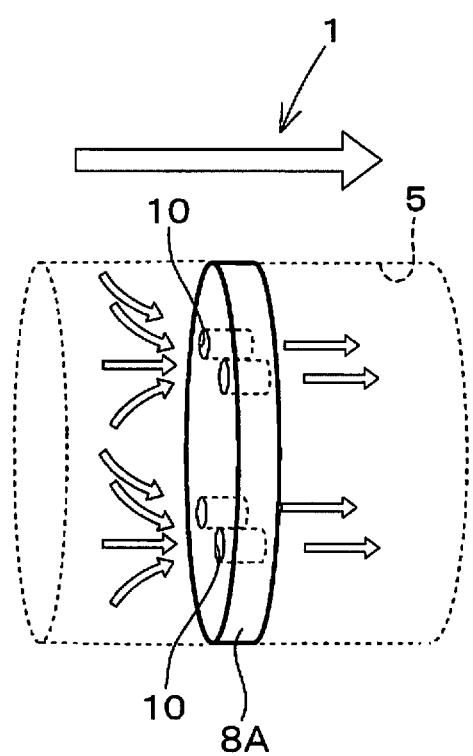
FIG. 1B is an enlarged perspective view of a part A of FIG. 1A.

As shown in FIG. 1B, a gel reduction member 8A as a one component of the gel reduction mechanism 8 of the first embodiment is a plate-like piece provided in the polymer flow duct 5 to cross the polymer flow duct 5, and mounted in the polymer flow duct 5 using a ring piece 9 to be described later. This gel reduction member 8A is provided with at least one or more squeezing flow paths 10 having a flow path cross-sectional area smaller than the polymer flow duct 5. In this embodiment as well, one gel reduction member 8A is formed with four squeezing flow paths 10.

As shown in FIGS. 2A-2B, the ring piece 9 fixes the gel reduction member 8A mounted on the inner circumferential surface of the cylindrical polymer flow duct 5. An annular mounting groove 11 continuous in a circumferential direction is formed in the inner circumferential surface of this ring piece 9, and the gel reduction member 8A is so fixed to the inner peripheral surface of the polymer flow duct 5 that the outer edge thereof is partly fitted into this mounting groove 11. Note that the ring piece 9 has a divided structure composed of a plurality of pieces and the respective pieces are integrally assembled after the gel reduction member 8A is fitted into the mounting groove.

The squeezing flow paths 10 are formed to penetrate through the gel reduction member 8A from the upstream side to the downstream side and allow the polymer kneaded compound to pass from the upstream side to the downstream side therethrough. The squeezing flow paths 10 of this embodiment are preferably through holes having a circular cross section (circular through holes) so that no irregularities which trigger the polymer kneaded compound to stay are formed in the flow paths, but may be polygonal through holes.

Note that although the shown form of the squeezing flow paths 10 is a straight cylindrical shape having the same cross section from the upstream side to the downstream side, it may be so tapered that the cross section (diameter) is reduced from the upstream side to the downstream side or from the downstream side to the upstream side.

Further, one gel reduction member 8A may be provided with only one squeezing flow path 10 or a plurality of squeezing flow paths 10. In the case of forming a plurality of squeezing flow paths 10, they are equally arranged on surfaces of the gel reduction member 8A, in other words, averagely arranged at a maximum possible distance from each other on the surfaces. In this embodiment, center points of the squeezing flow paths 10 are located near midpoints of lines connecting the outer peripheral edge of the gel reduction member 8A having a circular shape when the gel reduction member 8A is viewed from front and the center of this circle. Further, the squeezing flow paths 10 are respectively formed at positions rotationally symmetrical by 90° with respect to the center of the circular gel reduction member 8A.

The above squeezing flow paths 10 are for generating an extensional flow in the polymer kneaded compound passing therethrough by causing the polymer kneaded compound flowing in the polymer flow duct 5 to flow substantially perpendicularly toward the squeezing flow paths 10 after flowing along the upstream surface of the gel reduction member 8A and causing the polymer kneaded compound to flow into the squeezing flow paths 10 having a flow path cross-sectional area considerably smaller than that of the polymer flow duct 5 in a concentrated manner. Thus, there is a predetermined squeeze ratio capable of generating an extensional flow in the polymer kneaded compound between the flow path cross-sectional area of the polymer flow duct 5 and those of the squeezing flow paths 10.

For example, if the flow path cross-sectional areas of the squeezing flow paths 10 are too large as compared with that of the polymer flow duct 5, a sufficient pressure cannot be applied to the polymer kneaded compound flowing through the paths and no extensional flow is generated. Further, if the flow path cross-sectional areas of the squeezing flow paths 10 are too small as compared with that of the polymer flow duct 5, a pressure difference (pressure drop) between the upstream and downstream sides of the gel reduction member 8A becomes excessive to exceed an allowable withstanding pressure of the polymer flow duct 5. It is not preferable since a flow rate and a productivity must be reduce.

Next, this squeeze ratio is described in detail.

The squeezing flow paths 10 of the present invention are so set that a squeeze ratio S1/S2 of the squeezing flow paths 10 satisfies the following relationship to enable generation of an extensional flow in a polymer kneaded compound passing through these squeezing flow paths 10.

[Equation 1]

$$\text{squeeze ratio } S1/S2 \text{ of the squeezing flow path} = 25 \text{ to } 180 \quad (1)$$

where S1 is a flow path cross-sectional area of the polymer flow duct and S2 is a sum total of flow path cross-sectional area of the squeezing flow path.

The meaning of this equation (1) is described as follows, taking the case of FIGS. 2A-2B as an example.

For example, a large circular part in FIGS. 2A-2B represents the polymer flow duct 5 when viewed from the upstream side, in other words, the cross section of the polymer flow duct in a state where the cross-sectional area of the flow path is not narrowed by the gel reduction member 8A. The cross-sectional area of this polymer flow duct 5 is denoted by S1. On the other hand, when the squeezing flow paths 10 are likewise viewed from the upstream side, they are represented by four small circles formed in the large circle. There are four small circular cross-sections which respectively have cross-sectional areas of S2(1), S2(2), S2(3) and S2(4).

That is, the squeeze ratio S1/S2 shown in the above equation (1) is obtained by calculating the sum total of the flow path cross-sectional areas of the four squeezing flow paths 10 "S2(1)+S2(2)+S2(3)+S2(4)" and dividing the flow path cross-sectional area S1 of the polymer flow duct 5 by this sum total.

Although there are four squeezing flow paths 10 in the example of FIGS. 2A-2B, there may be one, two, three, five or more squeezing flow paths 10. When there are n (n=2 or greater) squeezing flow paths 10 in this way, the squeeze ratio S1/S2 can be calculated as in the case of FIGS. 2A-2B using the sum total of S2(1) to S2(n) as S2.

If the squeeze ratio of the squeezing flow paths 10 formed in the gel reduction member 8A described above is set to 25 or larger, the total area of the squeezing flow paths 10 becomes smaller, a large force works on the polymer kneaded compound when the polymer kneaded compound flows into the squeezing flow paths 10 from the polymer flow duct 5 while being more throttled and the polymer kneaded compound is extended in a laying direction of the polymer flow duct 5.

When the polymer kneaded compound is extended, the gel contained in this polymer kneaded compound is also extended, whereby dispersion of the gel progresses and the gel contained in the polymer kneaded compound can be reduced.

On the other hand, if the total area of the squeezing flow paths 10 is reduced as much as possible just because it is better to reduce the total area of the squeezing flow paths 10, an excessive pressure drop is produced upon the passage through the squeezing flow paths 10. Thus, the pressure drop approaches the allowable pressure of the device and production rate has to be reduced. Therefore, the squeeze ratio of the squeezing flow paths 10 is preferably smaller than 180 so as not to produce an excessive pressure drop. By doing so, it is possible to suppress the pressure drop and maintain good production efficiency while reducing the gel.

Second Embodiment

Next, a gel reduction device 1 of a second embodiment is described.

As shown in FIGS. 3AA-3AB, a gel reduction mechanism 8 of the gel reduction device 1 of the second embodiment is so formed that a plurality of gel reduction members 8A of the first embodiment are arranged while being spaced apart in the laying direction of the polymer flow duct 5 (extending direction of the polymer flow duct 5 or axial center direction of the polymer flow duct 5). Specifically, this gel reduction device 1 includes a first gel reduction member 12 arranged at an upstream side and a second gel reduction member 13 arranged at a downstream side.

The first gel reduction member 12 is a disk-like member having the same thickness as 11. the gel reduction member 8A of the first embodiment and includes four squeezing flow paths 10 penetrating from the upstream side toward the downstream side. The perforated positions and flow path cross-sectional areas of these squeezing flow paths 10 are also exactly the same as the gel reduction member 8A of the first embodiment.

The second gel reduction member 13 is arranged at a downstream side of the first gel reduction member 12 while being spaced part by a distance which is about equal to the thickness of the gel reduction member 8A of the first embodiment. The second gel reduction member 13 is a disk-like member having the same thickness as the first gel reduction member 12 and includes four squeezing flow paths 10 having the same flow path cross-sectional areas similar to the first gel reduction member 12.

The first and second gel reduction members 12, 13 differ in that the squeezing flow paths 10 of the first gel reduction member 12 provided at the upstream side of the polymer flow duct 5 and those of the second gel reduction member 13 provided at the downstream side do not overlap when viewed in the laying direction of the polymer flow duct 5. That is, the squeezing flow paths 10 of the first gel reduction member 12 are at positions of 0°, 90°, 180° and 270° with respect to the center of the gel reduction member, whereas the squeezing flow paths 10 of the second gel reduction member 13 are at positions of 45°, 135°, 225° and 315° with respect to the center of the gel reduction member. The squeezing flow paths 10 of the both gel reduction members 12, 13 are in a positional relationship circumferentially shifted from each other.

As a result, in the gel reduction device 1 of the second embodiment, a polymer kneaded compound can be extended twice at the first gel reduction member 12 and the second gel reduction member 13 and gel in the polymer kneaded compound can be reliably reduced.

Note that if the squeezing flow paths 10 of the first gel reduction member 12 and those of the second gel reduction member 13 are provided at the same position in the laying direction of the polymer flow duct 5, the polymer kneaded compound having passed through the squeezing flow paths 10 of the first gel reduction member 12 flows into the squeezing flow paths 10 of the second gel reduction member 13 while being hardly subjected to any force. Thus, an effect achieved by providing the gel reduction member 8A of the first embodiment at two positions cannot be sufficiently fulfilled.

In the above first and second embodiments, the gel reduction mechanism 8 is formed by processing a solid plate such as a stainless steel plate material. However, a porous filter-like member 14 as shown in third and fourth embodiments may also be used in the gel reduction mechanism 8.

Third Embodiment

Figure 4A:
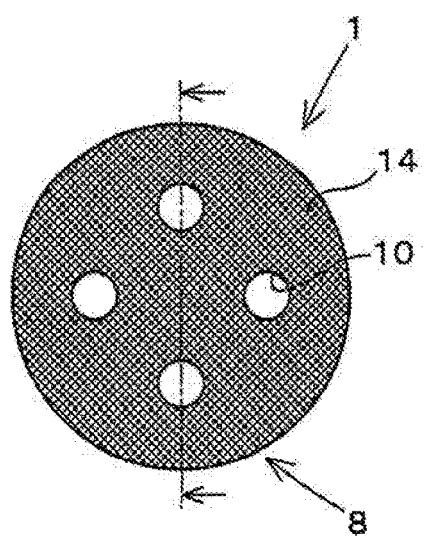
Figure 4A:
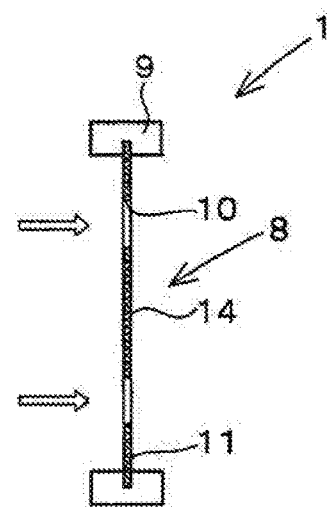

As shown in FIGS. 4AA-4AB, 4BA-4BB, 4CA-4CB a gel reduction device 1 of a third embodiment includes a filter-like member 14, which is a circular metal plate formed with a multitude of passage pores, as a gel reduction mechanism 8.

This filter-like member 14 is a metal mesh formed by interweaving metal strands such that a mesh size of the passage pores is 180 μm or smaller and allows passage of foreign matters other than those having large sizes such as gel in a polymer kneaded compound. The thickness of this filter-like member 14 is very small as compared with the gel reduction mechanisms 8 of the first and second embodiments. Also in a shown example, the thickness of the gel reduction mechanism 8 of the third embodiment is about 1/10 of those of the gel reduction mechanisms 8 of the first and second embodiments.

The porous gel reduction mechanism 8 described above is formed with four squeezing flow paths 10 similar to the first and second embodiments. These squeezing flow paths 10 are formed to penetrate through the filter-like member 14 from an upstream side toward a downstream side and allow passage of a polymer kneaded compound from the upstream side toward the downstream side. Further, the squeezing flow paths 10 are formed as through holes having a circular cross section (circular through holes) similar to the first and second embodiments.

This filter-like member 14 not only includes a multitude of passage pores as described above, but also has a very small thickness, thereby being low in strength. Thus, if an excessive pressure drop affects the gel reduction mechanism 8 or the amount of the polymer kneaded compound to be processed increases even slightly, the filter-like member 14 itself may be deformed and detached from the polymer flow duct 5. In such a case, the filter-like member 14 may be sandwiched by two supporting mesh members 15 from the upstream and downstream sides to be reinforced.

Figure 4B:
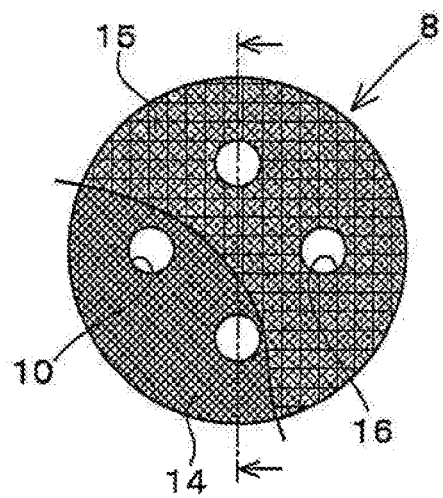
Figure 4B:
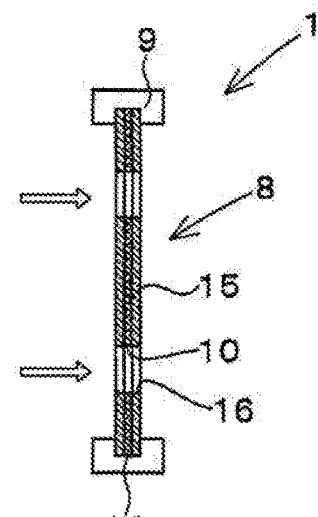

For example, a gel reduction mechanism 8 shown in FIGS. 4BA-4BB includes a filter-like member 14 formed to have a disk-like shape as in FIGS. 4AA-4AB and supporting mesh members 15 arranged at the upstream and downstream sides of this filter-like member 14 to support the filter-like member 14. These supporting mesh members 15 include openings 16 at positions corresponding to the squeezing flow paths 10 of the filter-like member 14 and having the same cross-sectional areas as the squeezing flow paths 10, so that the polymer kneaded compound can pass through the squeezing flow paths 10 without any problem.

The supporting mesh members 15 are formed as metal meshes made of metal strands thicker than those of the filter-like member 14 and having a larger mesh size than the filter-like member 14, thereby being so structured as not to hinder passage of the polymer kneaded compound.

The gel reduction mechanism 8 shown in FIGS. 4BA-4BB has a multilayer structure in which the filter-like member 14 is sandwiched by these two supporting mesh members 15 and has higher strength than the one shown in FIGS. 4AA-4AB by adopting such a multilayer structure.

Figure 4C:
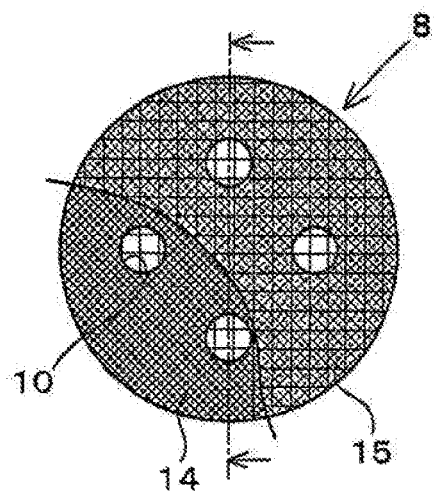
Figure 4C:
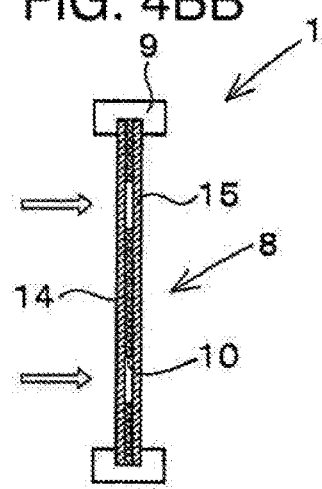

Since the supporting mesh members 15 described above are formed as metal meshes having such a large mesh size as not to hinder passage of the polymer kneaded compound, the polymer kneaded compound can pass through the supporting mesh members 15 without any problem even if the openings 16 are not formed at the positions corresponding to the squeezing flow paths 10 of the filter-like member 14. Thus, it is also possible to reinforce the filter-like member 14 using such supporting mesh members 15 not formed with the openings 16 as shown in FIGS. 4CA-4CB. If such supporting mesh members 15 are used, time and effort for forming the openings 16 become unnecessary and production cost of the gel reduction mechanism 8 can be reduced.

In the gel reduction mechanism 8 of the third embodiment, such squeezing flow paths 10 as shown in the first and second embodiments are formed in such a fine filter-like member 14. By doing so, a part of the polymer kneaded compound flowing into the gel reduction mechanism 8 of the third embodiment passes the filter-like member 14 itself and the remaining part thereof flows into the squeezing flow paths 10 to be extended, whereby the gel is removed. In other words, the gel reduction device 1 of the third embodiment can be said to have a function of removing the gel by allowing the polymer kneaded compound to pass through the fine filter and a function of extending and removing the gel by allowing the polymer kneaded compound to pass through the squeezing flow paths 10.

If the mesh size of the filter-like member 14 is set to 180 µm or smaller, the meshes of the filter-like member 14 become very fine and the filter-like member 14 itself can remove the gel from the polymer kneaded compound.

Fourth Embodiment

Next, a gel reduction device 1 of a fourth embodiment is described.

Figure 5A:
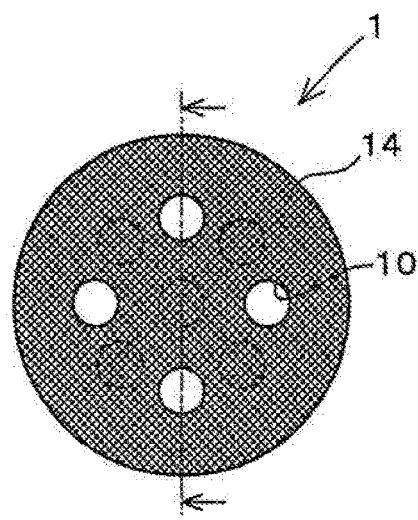
Figure 5A:
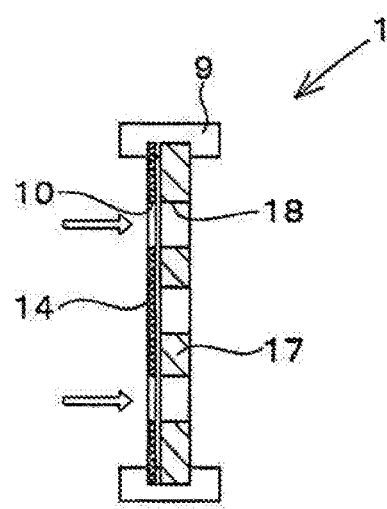

As shown in FIGS. 5AA-5AB, 5BA-5BB, 5CA-5CB, each gel reduction mechanism 8 of the gel reduction device 1 of the fourth embodiment further includes a supporting member 17 arranged at the downstream side of the filter-like member 14 of the third embodiment for supporting this filter-like member 14. This supporting member 17 is arranged at the downstream side of the filter-like member 14 and supports the filter-like member 14 so that the filter-like member 14 itself is not deformed. Further, the supporting member 17 includes flow holes 18 so that a polymer kneaded compound having passed through the filter-like member 14 can flow toward the downstream side without any problem, such as breakage of a filter-like member.

Specifically, the supporting member 17 is made of a material (e.g. stainless steel plate material) having a hardness equal to or higher than that of an assembly of the filter-like member 14 and the supporting mesh members 15. This supporting mesh member 17 is also formed to have the same disk-like shape as the filter-like member 14 and so mounted in the polymer flow duct 5 as to cross the polymer flow duct 5.

As shown in FIGS. 5AA-5AB, the flow holes 18 that allow the polymer kneaded compound having passed through the gel reduction mechanism 8 to be further fed toward the downstream side are formed in the surface of the supporting member 17. These flow holes 18 are formed to penetrate through the supporting member 17 from the upstream side toward the downstream side and allow the polymer kneaded compound to flow from the upstream side toward the downstream side via the interiors of the supporting member 17.

These flow holes 18 are formed at nine positions on the surface of the supporting member 17.

The flow holes 18 at the nine positions have an opening diameter at least equal to or larger than those of the squeezing flow paths 10 formed in the gel reduction member 8A of the first embodiment, and are formed at positions concentric with these squeezing flow paths 10.

That is, four flow holes 18 out of nine communicate with the squeezing flow paths 10 such that the center positions thereof respectively coincide with those of the squeezing flow paths 10 when viewed from front, and the polymer kneaded compound having passed through the squeezing flow paths 10 can flow into the flow holes 18 without being stayed (without producing an excessive pressure drop).

Figure 7:
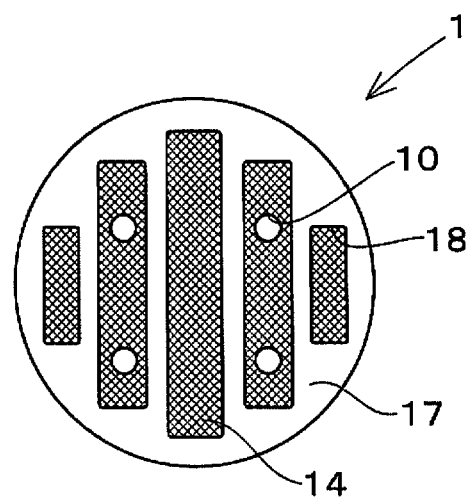
FIG. 7 is a view as a reference showing another example of a supporting member.

Note that the flow holes 18 of the supporting member 17 described above need not be circular holes and may be slits, for example, as shown in FIG. 7. However, in this case, the flow holes 18 need to be so arranged as not to hinder the flow of the polymer kneaded compound having passed through the squeezing flow paths 10.

To sum up, a relationship between the above flow holes 18 and the squeezing flow paths 10 means that the sum total of the flow path cross-sectional areas of the flow holes 18 formed in the supporting member 17 (four flow holes 18 described above) is considerably larger than that of the flow path cross-sectional areas of the squeezing flow paths 10 formed in the gel reduction mechanism 8. By doing so, a pressure drop produced by the flow holes 18 is not as large as that produced by the squeezing flow paths 10, therefore the polymer kneaded compound can smoothly flow toward the downstream side without excessive pressure drop.

The remaining five flow holes 18 formed in the supporting member 17 are at positions different from the squeezing flow paths 10, do not communicate with the squeezing flow paths 10, and allow the polymer kneaded compound having passed through the filter-like member 14 itself to be fed toward the downstream side rather than the polymer kneaded compound having passed through the squeezing flow paths 10.

Figure 5B:
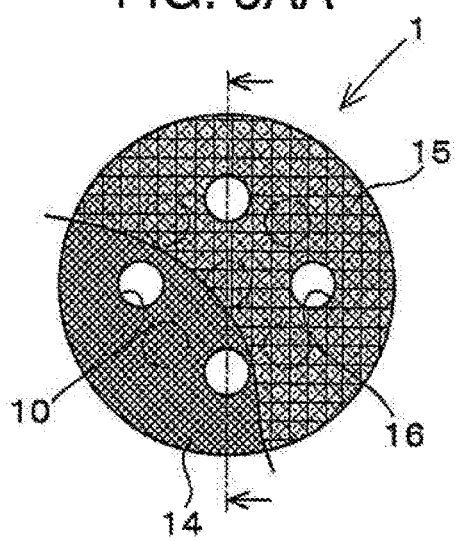
Figure 5B:
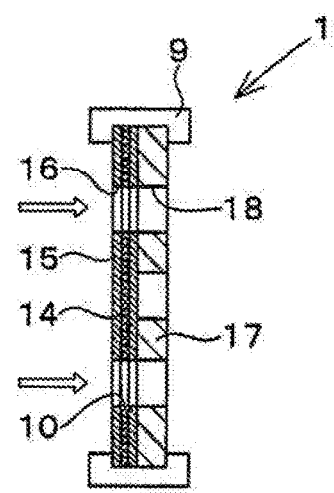
Figure 5C:
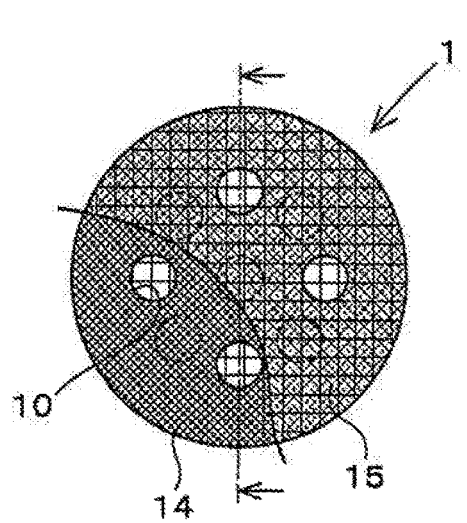
Figure 5C:
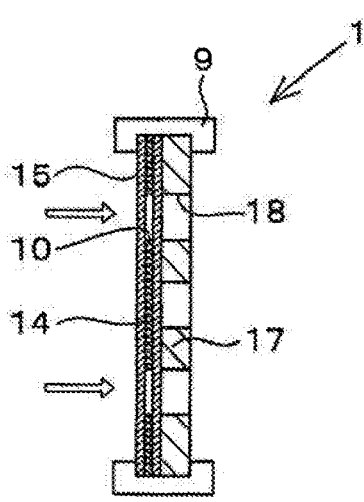

The supporting member 17 described above may be used for the multilayer structured gel reduction mechanism 8 in which the filter-like member 14 is sandwiched by the two supporting mesh members 15 as shown in FIGS. 5BA-5BB and 5CA-5CB.

obtained by mixing 2.3% of carbon black for a high-density polyethylene (density=0.945 g/cm$^3$, melt index=0.08 g/10 min, 190° C., load of 2.16 kg-w) as a base material. The high-density polyethylene and carbon black were supplied in a powder form to this mixing and extrusion equipment 2 and the polymer kneaded compound kneaded in the mixing and extrusion equipment 2 was extruded through the polymer flow duct 5 via gear pump at a rate of 50 kg/h.

First, results obtained using the gel reduction device 1 of the first embodiment, in other words, the gel reduction member 8A made of a solid plate member are shown in Table 1. Table 1 shows how a squeeze ratio, a shear rate, an extrusion pressure and a white spot area ratio changed when the diameter and number of the squeezing flow paths 10 formed in the gel reduction member 8A were changed.

TABLE 1

|  | Diameter D Of Squeezing flow paths [mmφ] | Number n of Squeezing flow paths | Squeeze ratio [—] | Shear Rate γ' [/sec.] | Extrusion Pressure [MPa] | White Spot Area Ratio [%] |
| --- | --- | --- | --- | --- | --- | --- |
| Comp. Example 1 | NONE | NONE | (1.0) | (2.9) | 4.7 | 0.48 |
| Exp. Example 1 | 2.00 | 16 | 25.0 | 1474 | 13.8 | 0.23 |
| Exp. Example 2 | 2.00 | 9 | 44.4 | 2621 | 16.7 | 0.10 |
| Exp. Example 3 | 2.00 | 4 | 100.0 | 5898 | 22.1 | 0.08 |
| Exp. Example 4 | 1.00 | 16 | 100.0 | 11795 | 25.2 | 0.08 |
| Exp. Example 5 | 1.50 | 4 | 177.8 | 13980 | 27.5 | 0.07 |
| Comp. Example 2 | 1.15 | 6 | 201.6 | 16545 | 30.5 | 0.07 |

Figure 6A:
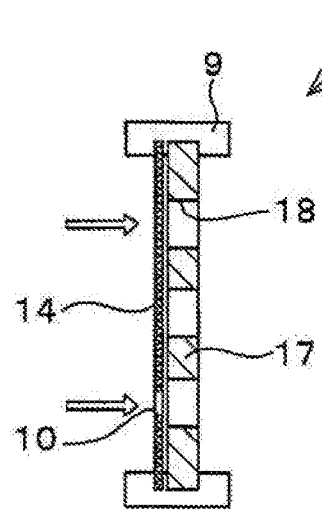
Figure 6A:
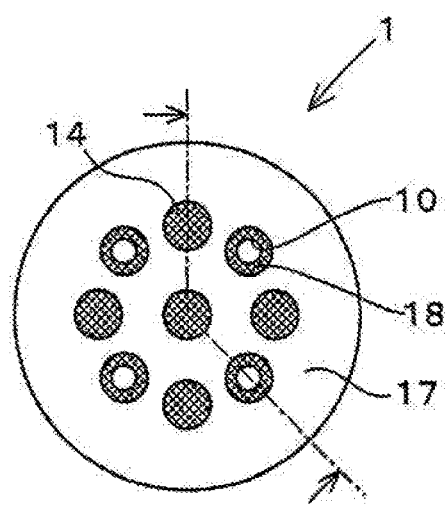
Figure 6B:
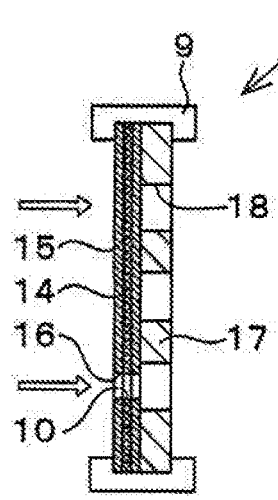
Figure 6B:
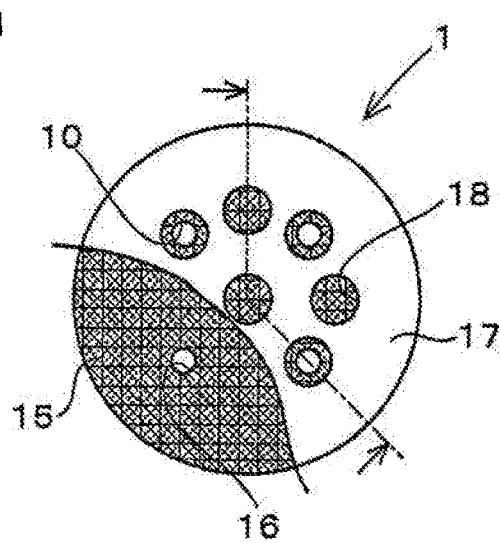
Figure 6C:
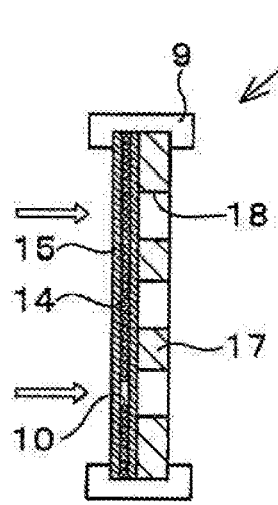
Figure 6C:
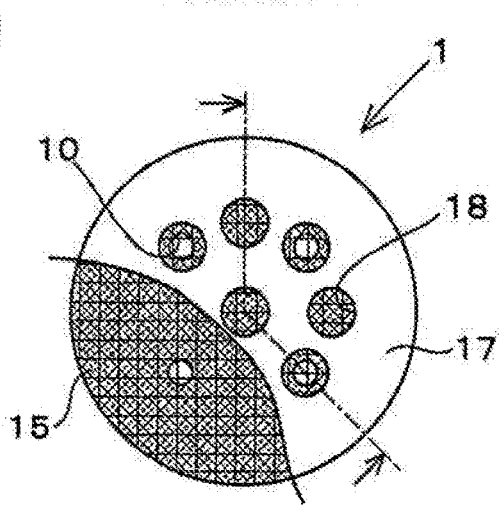

Further, as shown in FIGS. 6AA-6AB, 6BA-6BB. 6CA-6CB, the opening diameters of the flow holes 18 are preferably larger than those of the squeezing flow paths 10 formed in the gel reduction mechanism 8 when the flow holes 18 are arranged at the positions concentric with the squeezing flow paths 10. If the opening diameters of the flow holes 18 are made larger than those of the squeezing flow paths 10 in this way, the polymer kneaded compound having passed through the squeezing flow paths 10 can smoothly pass through the flow holes 18.

Note that although all the shapes relating to the present invention including the polymer flow duct 5 and the gel reduction members described and shown in the embodiments thus far are circular, these shapes may also be, of course, polygonal shapes including rectangular shapes.

EXPERIMENTAL EXAMPLES

Next, the gel reduction device 1 of the present invention is described in more detail using experimental examples and comparative examples.

In the experimental examples and the comparative examples, the presence of gel in a polymer kneaded compound was confirmed using an actual apparatus when the polymer kneaded compound was actually processed using the mixing and extrusion equipment 2 including the gel reduction device 1. Out of these experimental examples and comparative examples, Examples 1 to 5 correspond to the first embodiment, and Examples 6 to 10 correspond to the third embodiment.

Any of these mixing and extrusion equipment 2 used in these experimental examples and comparative examples was such that the gel reduction device 1 was mounted in the polymer flow duct 5 for conveying a polymer kneaded compound from a twin-rotor mixer (LCM50) to the strand die 6 via the gear pump 7. The polymer kneaded compound supplied to this mixing and extrusion equipment 2 was Out of evaluation items shown in Table 1, the shear rate γ is calculated by the following equation (2):

[Equation 2]

$$\gamma = (4 \times Q/n)/(\pi \times (D/2)^3) \qquad (2)$$

Where,
Q: Production rate (cm$^3$/sec]
n: Number of squeezing flow paths (–)
D: Diameter of squeezing flow paths (mm)

Further, the extrusion pressure indicates a polymer pressure (at a position P in FIG. 1) of the polymer kneaded compound immediately before the gel reduction member 8A in the polymer flow duct 5 of the mixing and extrusion equipment 2.

Further, the white spot area ratio is an area ratio indicating how many percentages insufficiently kneaded parts are observed, i.e. how much gel is observed in the polymer kneaded compound extruded from the strand die 6. That is, with the composition described above, when there is an insufficient kneaded area, transparent parts due to non-incorporate of the carbon black are observed as an area ratio of gel in the extruded polymer kneaded compound.

Thus, if the extruded polymer kneaded compound is cut into thin pieces of about 20 μm using microtoma and how many transparent parts are present in the thin cut pieces is measured, a gel improvement ratio can be evaluated. Note that this measurement of the area ratio is performed with ×200 photo observation by an optical microscope. Results of the comparative examples and the experimental examples are described in detail below.

Comparative Example 1

Comparative Example 1 is an example in which no gel reduction mechanism 8 (gel reduction member 8A) was provided in the polymer flow duct 5, in other words, the polymer kneaded compound was allowed to flow without doing anything. In this Comparative Example 1, no extensional flow was generated in the polymer kneaded compound and the gel was not reduced at all as can be understood from a white spot area ratio result of 0.48% in Table 1.

Experimental Example 1

As compared with Comparative Example 1, in Experimental Example 1, a gel reduction member 8A (first embodiment) made of a solid circular plate having a thickness of 2.5 mm was so arranged in a polymer flow duct 5 having a diameter of 40 mm as to cross this polymer flow duct 5. Squeezing flow paths 10 having a diameter of 2 mm were formed at a total of sixteen positions in this gel reduction member 8A and the squeeze ratio was 25.0.

In this Experimental Example 1, the white spot area ratio was approximately reduced to half and gel in a polymer kneaded compound was largely reduced as can be observed from a white spot area ratio result of 0.23% in Table 1.

Experimental Examples 2 to 5

In Experimental Examples 2 and 3, squeezing flow paths 10 having a diameter of 2 mm were formed in a gel reduction member SA made of a solid circular plate having a thickness of 2.5 mm. The squeezing flow paths 10 of Experimental Example 2 were formed at nine positions and the squeeze ratio was 44.4. Further, the squeezing flow paths 10 of Experimental Example 3 were formed at four positions and the squeeze ratio was 100.0.

On the other hand, in Experimental Example 4, the diameter of squeezing flow paths 10 was reduced to half, i.e. to 1 mm as compared with Experimental Example 3. In this Experimental Example 4, the number of the squeezing flow paths 10 was quadrupled although the diameter thereof was reduced to half, wherefore the total flow path cross-sectional area of the squeezing flow paths 10 was equal in Experimental Example 3 and Experimental Example 4. Thus, the squeeze ratio in Experimental Example 4 was also 100.0.

Further, in Experimental Example 5, squeezing flow paths 10 having a diameter of 1.5 mm were formed at four positions and the number of the squeezing flow paths 10 was reduced as compared with Experimental Example 3. Thus, the squeeze ratio in this Experimental Example 5 was 177.8.

In Experimental Examples 2 to 5, the white spot area ratio was very small as compared with Comparative Example 1 and the gel in the polymer kneaded compound was largely reduced as can be observed from the white spot area ratio results of 0.07% to 0.10% in Table 1.

The squeeze ratio had the same numerical value of 100.0 and the white spot area ratio was 0.08% in both Experimental Example 3 and Experimental Example 4. On the other hand, a shear rate of 11795/sec in Experimental Example 4 was larger than a shear rate of 5898/sec in Experimental Example 3 and, accordingly, an extrusion pressure of 25.2 MPaG in Experimental Example 4 was larger than an extrusion pressure of 22.1 MPaG in Experimental Example 3.

From these results, the white spot area ratio (gel disappearance rate) depends on the squeeze ratio, but have no clear relationship with the shear rate. Therefore, in suppressing a gel production rate to the same extent, the extrusion pressure (pressure drop) can be suppressed to an appropriate level and higher productivity can be realized by selecting an appropriate squeeze ratio and using such a gel reduction member 8 as to reduce the shear rate. In the case of the experimental examples, it is more preferable to select the gel reduction device 1 of Experimental Example 3 than that of Experimental Example 4.

Comparative Example 2

As compared with Experimental Examples 1 to 5, squeezing flow paths 10 having a diameter of 1.15 mm were formed at six positions and the squeeze ratio was 201.6 in Comparative Example 2.

This Comparative Example 2 had an effect of reducing gel similar to Experimental Examples 1 to 5 as can be observed from a white spot area ratio result of 0.07% in Table 1.

However, in Table 1, the extrusion pressure was as high as 30.5 MPaG in Comparative 21. Example 2 and it can be considered that the pressure drop becomes higher by providing the gel reduction member 8A (first embodiment).

As compared with the result of Experimental Example 5, the white spot area ratio was equal, i.e. 0.07% in both Comparative Example 2 and Experimental Example 5, but the extrusion pressure was higher in Comparative Example 2 than in Experimental Example 5. It can be considered from this that the use of the gel reduction member having a squeeze ratio of 180 or larger results in only to an increase in the extrusion pressure, but does not bring about any significant effect of reducing the gel.

Next, results of reducing the gel using the gel reduction device 1 of the third embodiment is described with reference to Table 2.

Any of mixing and extrusion equipment 2 used in these experimental examples and comparative examples was such that a gel reduction device 1 was mounted in a polymer flow duct 5 for conveying a polymer kneaded compound from a twin-rotor mixer (LCM50) to a strand die 6 via the gear pump 7. A polymer kneaded compound supplied to these mixing and extrusion equipment 2 was obtained by mixing 2.3% of carbon black with a high-density polyethylene (density=0.950 g/cm$^3$, melt index=0.07 g/10 min, 190° C., load of 2.16 kg) as a base material. The high-density polyethylene and carbon black were supplied in a powder form to the mixing and extrusion equipment 2 and the polymer kneaded compound kneaded in the mixing and extrusion equipment 2 was extruded through the polymer flow duct 5 via gear pump at a rate of 50 kg/h.

Table 2 shows how a squeeze ratio, a shear rate, an extrusion pressure and a white spot area ratio changed when the diameter and number of the squeezing flow paths 10 formed in the gel reduction mechanism 8 were changed.

TABLE 2

| | Mesh Configuration | Presence/ Absence of Squeezing flow paths | Diameter D [mmφ] of Squeezing flow paths | Number n of Squeezing flow paths | Squeeze ratio [—] | Extrusion Pressure [MPa] | White Spot Area Ratio [%] |
|---|---|---|---|---|---|---|---|
| Comp. Example 3 | 10/10 | NO | NONE | NONE | (—) | 6.1 | 1.8 |
| Exp. Example 6 | 10/100/250/100/10 | YES | 8.0 | 1 | 25.0 | 7.4 | 1.41 |

TABLE 2-continued

|  | Mesh Configuration | Presence/ Absence of Squeezing flow paths | Diameter D [mmφ] of Squeezing flow paths | Number n of Squeezing flow paths | Squeeze ratio [—] | Extrusion Pressure [MPa] | White Spot Area Ratio [%] |
|---|---|---|---|---|---|---|---|
| Exp. Example 7 | 10/100/250/100/10 | YES | 6.0 | 1 | 44.4 | 10.7 | 1.05 |
| Exp. Example 8 | 10/100/250/100/10 | YES | 4.0 | 1 | 100.0 | 14.0 | 0.85 |
| Exp. Example 9 | 10/100/250/100/10 | YES | 2.0 | 4 | 100.0 | 18.1 | 0.84 |
| Exp. Example 10 | 10/100/250/100/10 | YES | 1.5 | 4 | 177.8 | 23.3 | 0.83 |
| Comp. Example 4 | 10/100/250/100/10 | NO | NONE | NONE | (—) | 25.5 | 0.83 |

Results of the comparative examples and experimental examples are described in detail below.

Comparative Example 3

Comparative Example 3 is an example in which no gel reduction mechanism 8 was provided in a polymer flow duct 5. In this Comparative Example 3, a filter-like member 14 was not used, but a supporting member 17 including nine flow holes 18 (diameter of 8.0 mm) and supporting mesh members 15 including 10 large meshes were provided. In this Comparative Example 3, no extensional flow was generated in the polymer kneaded compound and the gel was not reduced at all as can be observed from a white spot area ratio result of 1.80% in Table 2.

Experimental Example 6

In Experimental Example 6, a filter-like member 14 (gel reduction mechanism 8) formed with squeezing flow paths 10 was arranged in a polymer flow duct having a diameter of 40 mm. This filter-like member 14 included a 250-mesh filter and 100-mesh filters arranged at upstream and downstream sides of this 250-mesh filter and sandwiching the 250-mesh filter.

A squeezing flow path 10 having a diameter of 8.0 mm was formed at one center position of the filter-like member 14 having this structure, and the squeeze ratio was 25.0. Further, this filter-like member 14 was sandwiched by supporting mesh members 15 including 10 meshes.

In this Experimental Example 6, the white spot area ratio was largely reduced and gel in a polymer kneaded compound was largely reduced as can be observed from a white spot area ratio result of 1.41% in Table 2.

Experimental Examples 7 to 10

A squeezing flow path 10 having a diameter of 6.0 mm was formed at one center position of the same filter-like member 14 as in Experimental Example 6 in Experimental Example 7, and a squeezing flow path 10 having a diameter of 4.0 mm was formed also at one center position of the same filter-like member 14 as in Experimental Example 6 in Experimental Example 8. The squeeze ratio in Experimental Example 7 was 44.4 and that in Experimental Example 8 was 100.0.

On the other hand, in Experimental Example 9, the diameter of squeezing flow paths 10 was reduced to half, i.e. to 2 mm as compared with Experimental Example 8. In this Experimental Example 9, as compared with Experimental Example 8, the number of the squeezing flow paths 10 was quadrupled although the diameter thereof was reduced to half, wherefore the total flow path cross-sectional area of the squeezing flow path(s) 10 was equal in Experimental Example 8 and Experimental Example 9. Thus, the squeeze ratio in Experimental Example 9 was also 100.0.

Further, in Experimental Example 10, squeezing flow paths 10 having a diameter of 1.5 mm were formed at four positions and the diameter of the squeezing flow paths 10 was reduced as compared with Experimental Example 9. Thus, the squeeze ratio in this Experimental Example 10 was 177.8.

In these Experimental Examples 6 to 10, the white spot area ratio was very small and the gel in the polymer kneaded compound was largely reduced as compared with Comparative Example 3 as can be observed from the white spot area ratio results of 0.83% to 1.41% in Table 2.

Comparative Example 4

As compared with Experimental Examples 6 to 10 described above, the same filter-like member 14 as in these experimental examples was used, but no squeezing flow path 10 was formed in this filter-like member 14 in Comparative Example 4.

This result of Comparative Example 4 was obtained by filtering out gel components, which caused white spots, using the conventional technology, i.e. a fine filter as shown in patent literature 1. The extrusion pressure had a very high value of 25.5 MPa. As compared with the result using an extensional flow of the present invention, e.g. the result of Experimental Example 10, the white spot area ratio was improved to the same numerical value in both Comparative Example 4 and Experimental Example 10, but the extrusion pressure was higher in Comparative Example 4 than in Experimental Example 10. Thus, Experimental Example 10 is better than Experimental Example 4 in terms of productivity.

Fifth Embodiment

Figure 8:
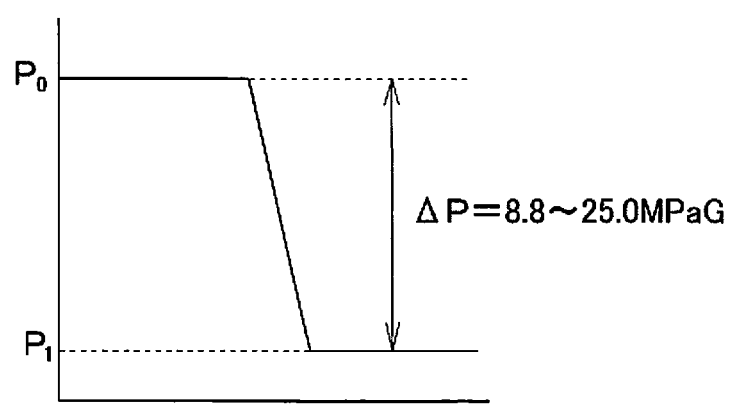
FIG. 8 is a graph showing a pressure drop produced in a pressure drop adding device.

Note that, in a fifth embodiment, a pressure drop adding device 100 is arranged instead of the gel reduction device 1 in the polymer flow duct 5 between the gear pump 7 and the strand die 6 in the mixing and extrusion equipment 2 described with reference to FIG. 1A. This pressure drop adding device 100 is for constantly applying a pressure drop in the range of 8.8 to 25.0 MPaG to a polymer kneaded compound when the polymer kneaded compound is passing in the polymer flow duct 5 (see FIG. 8). Note that "G" added to the unit of the pressure drop indicates a gauge pressure.

This pressure drop range of 8.8 to 25.0 MPaG is a range of such high pressures which will not be produced in the polymer flow duct when the mixing and extrusion equipment 2 is operated under a normal operation condition. In the present invention, a large pressure drop is steadily applied to the flowing polymer kneaded compound using this pressure drop adding device 100. Such a large pressure drop is applied to the polymer kneaded compound because it is desired to generate such an extensional flow as to extend a material in the polymer kneaded compound utilizing the fact that the area of the polymer flow duct is limited to produce a pressure drop and the gel is reduced by extending the polymer kneaded compound together with the gel. Thus, a pressure drop ΔP applied to the polymer kneaded compound by this pressure drop adding device 100 is preferably constantly maintained in the range of 8.8 to 25.0 MPaG.

Specifically, the pressure drop adding device 100 of the fifth embodiment is constructed as follows.

Figure 9A:
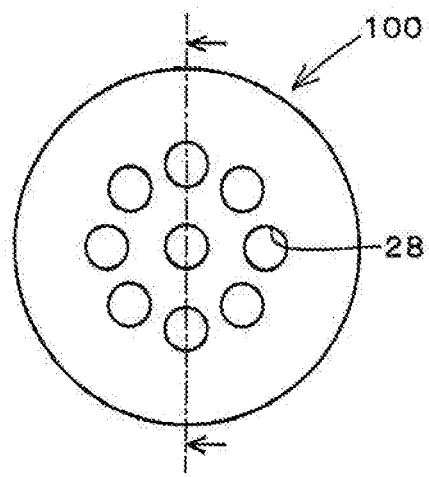
FIG. 9A shows a front view of a gel reduction device of a fifth embodiment.
Figure 9B:
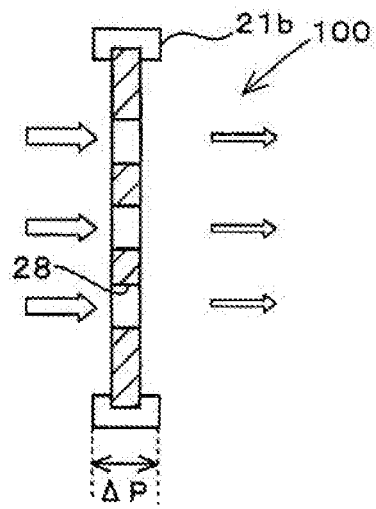
FIG. 9B shows a side view of a gel reduction device of a fifth embodiment.

As shown in FIGS. 9A-9B, the pressure drop adding device 100 of the fifth embodiment is made of a plate member such as a solid metal plate through which a polymer kneaded compound cannot permeate, and is provided in the polymer flow duct 5 to serve as a resistance to the flow of the polymer kneaded compound by limiting the area of the polymer flow duct 5. A squeezing flow path 28 having a flow path cross-sectional area smaller than the polymer flow duct 5 is provided at at least one or more positions, in a shown example at nine positions, in this plate member.

The squeezing flow paths 28 are formed to penetrate through the plate member from an upstream side toward a downstream side in a thickness direction (in a resin flowing direction) and can guide the polymer kneaded compound at the upstream side of the pressure drop adding device 100 toward the downstream side. The squeezing flow paths 28 of this embodiment are formed as through holes having a cylindrical surface (circular through holes) with no irregularities so that the polymer kneaded compound does not remain (stay) in the squeezing flow paths 28, but may be polygonal through holes provided that they can produce the above predetermined pressure drop.

All of the (nine) squeezing flow paths 28 provided in this pressure drop adding device 100 have the same flow path cross-sectional area, which is smaller than that of the polymer flow duct 5. Specifically, the dimensions of the respective squeezing flow paths 28 are in the order of mm (i.e. sufficiently large dimensions for gel having a dimension in the order of micron to pass through). More specifically, a diameter d of each squeezing flow path 28 is 1 (mm) or longer and a flow path cross-sectional area thereof is equivalent to $\pi d2/4$ (mm$^2$) or larger. By doing so, the squeezing flow paths can be so formed as to be able to apply a predetermined pressure drop to the polymer kneaded compound while preventing the closure of the flow paths by the gel. Note that when S2 denotes the flow path cross-sectional area of the polymer flow duct 5, the sum total S1 of the flow path cross-sectional areas of the squeezing flow paths 28 preferably provides a predetermined squeeze ratio S1/S2.

This squeeze ratio S1/S2 specifically satisfies a relationship defined by the following Equation (3).

$$S1/S2 \geq 44 \quad (3)$$

where S1: flow path cross-sectional area of the polymer flow duct, S2: sum total of the flow path cross-sectional areas of the squeezing flow paths. Note that it becomes difficult to obtain a desired pressure drop if the squeeze ratio S1/S2 is smaller than 44, and the pressure drop tends to become more than necessary and sufficient value if it is larger than 202. Thus, S1/S2 is preferably in the range of 44 to 202.

If the polymer kneaded compound is guided to the squeezing flow paths 10 having flow path cross-sectional areas narrower than the polymer flow duct 5 as described above, the flow path for the polymer kneaded compound is suddenly squeezed when passing through the squeezing flow paths 28 and a large difference in the pressure of the polymer kneaded compound (pressure in the polymer flow duct) is produced before and after the squeezing flow paths 28. That is, the pressure of the polymer kneaded compound at an upstream side of the squeezing flow paths 28 is P0 and that at a downstream side is P1 and a pressure drop ΔP (=P0−P1) of 8.8 to 25.0 MPaG is produced between the two pressures.

When passing through the squeezing flow paths 28 having a flow path cross-sectional area to produce such a pressure drop ΔP, the polymer kneaded compound is extended in a resin flowing direction and gel is also extended according to the extension of the polymer kneaded compound, wherefore dispersion of the gel progresses and the gel in the polymer kneaded compound can be reliably reduced.

A filter for filtering out gel using an existing mesh screen is replaced when being used over a long time to clog the meshes thereof. If it continues to be used without being replaced, the pressure drop increases due to the plugging mesh. However, since the pressure drop adding device 100 of the present invention uses the squeezing flow paths 28 free from mesh clogging as described below, mesh clogging is unlikely to occur and the flow path areas of the squeezing flow paths 28 are ensured even if this device is used over a long time, wherefore the pressure drop ΔP can be constantly maintained in the range of 8.8 to 25.0 MPa. That is, existing mesh screens and the like cannot constantly maintain the pressure drop in the range of 8.8 to 25.0 MPaG.

Note that the pressure drop adding device 100 capable of producing the above pressure drop ΔP of 8.8 to 25.0 MPaG in various shapes and structures can be considered as shown in the following embodiments (sixth and seventh embodiments).

Sixth Embodiment

Next, a pressure drop adding device 100 of a sixth embodiment is described.

Figure 10A:
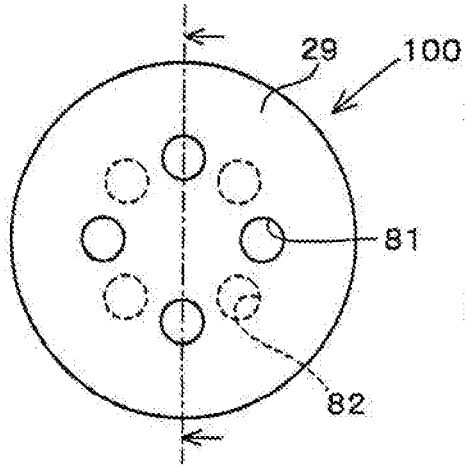
FIG. 10A shows a front view of a gel reduction device of a sixth embodiment.
Figure 10B:
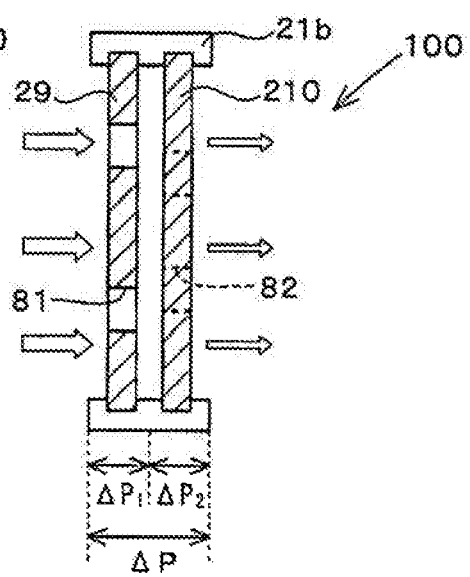
FIG. 10B shows a side view of a gel reduction device of a sixth embodiment.

As shown in FIGS. 10A-10B, the pressure drop adding device 100 of the sixth embodiment is obtained by combining two plate members each including four squeezing flow paths 81, 82 in its surface.

Specifically, the pressure drop adding device 100 of the sixth embodiment includes two plate members, i.e. a first plate member 29 provided at an upstream side and a second plate member 210 provided at a downstream side which are spaced apart in a flowing direction of a polymer kneaded compound. The squeezing flow paths 81 of the first plate member 29 provided at the upstream side and those 82 of the second plate member 210 provided at the downstream side are not adjusted to the same position when viewed in the polymer flowing direction, and the squeezing flow paths 81, 82 of the two plate members are in a positional relationship circumferentially shifted by 45° about an axial center of the polymer flow duct 5.

The squeezing flow paths 81 of the first plate member 29 have flow path cross-sectional areas capable of producing a pressure drop ΔP1 before and the after the squeezing flow paths 81 of the first plate member 29. The squeezing flow paths 82 of the second plate member 210 have flow path cross-sectional areas capable of producing a pressure drop ΔP2 before and the after the squeezing flow paths 82 of the second plate member 210. The sum of the pressure drop ΔP1 produced by the first plate member 29 and the pressure drop ΔP2 produced by the second plate member 210 is a numerical value in the range of 8.8 to 25.0 MPaG described above.

Such a pressure drop adding device 100 of the sixth embodiment can produce a pressure drop of 8.8 to 25.0 MPaG as a whole by combining a plurality of such plate members even if a predetermined pressure drop cannot be obtained, for example, by a pressure drop adding device 100 composed of one plate member.

Seventh Embodiment

Next, a pressure drop adding device 100 of a seventh embodiment is described.

Figures 11A, 11B:
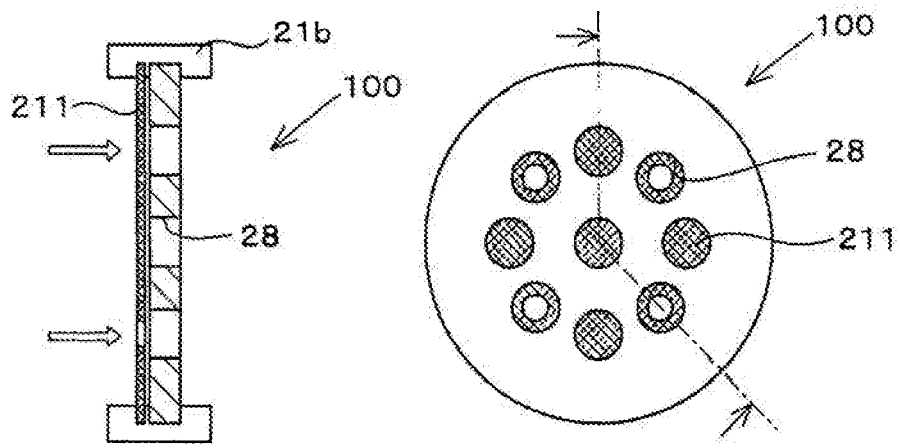
FIG. 11A shows a front view of a gel reduction device of a seventh embodiment.
FIG. 11B shows a side view of a gel reduction device of a seventh embodiment.

As shown in FIGS. 11A-11B, the pressure drop adding device 100 of the seventh embodiment does not use a solid plate member unlike the fifth and sixth embodiments. The pressure drop adding device 100 is obtained by forming a porous member 211 such as a mesh to have a plate-like shape, forming squeezing flow paths 28 relatively and sufficiently larger than respective pores of the porous member 211 in the porous member 211, and placing a solid plate member formed with a plurality of holes larger than the squeezing flow paths 28 on the downstream side of the porous member 211 in such a manner as not to close the squeezing flow paths 28.

Specifically, the pressure drop adding device 100 of the seventh embodiment allows passage of a polymer kneaded compound not only through the squeezing flow paths 28, but also through the porous member 211 itself. That is, a pressure drop ΔP produced between the upstream side and the downstream side of the pressure drop adding device 100 of the seventh embodiment is composed of not only a pressure drop acting on the polymer kneaded compound passing through the polymer flow ducts 28, but also a pressure drop acting on the polymer kneaded compound passing through the porous plate member 211, and the pressure drop ΔP of 8.8 to 25.0 MPaG as the sum total of these pressure drops is constantly produced.

The pressure drop adding device 100 of the seventh embodiment indicates that a pressure drop in the range of 8.8 to 25.0 MPaG can be constantly produced by elaboration to form such squeezing flow paths as to cause no substantial mesh clogging even if the porous plate member 211 capable of filtering gel from a polymer kneaded compound such as a mesh is, for example, used instead of a solid plate member, i.e. indicates that gel can be reduced while high productivity is maintained even if such a pressure drop adding device 100 composed of the porous plate member 211 is used.

Although the porous plate member 211 illustrated is a single-layered mesh formed with such flow paths as not to cause substantial mesh clogging in this embodiment, it may be a multi-layered mesh or a porous ceramic or the like formed with such flow paths as not to cause substantial mesh clogging.

Experimental Examples

Next, effects and functions of the gel reduction method of the present invention are described using experimental examples and comparative examples.

In the experimental examples and the comparative examples, the presence of gel in a polymer kneaded compound was confirmed when an experiment was carried out to produce the polymer kneaded compound using a mixing and extrusion equipment 2 actually including the pressure drop adding device 100.

Experimental Examples 11 to 15, Comparative Examples 5, 6

In any of these Experimental Examples 11 to 15 and Comparative Examples 5, 6, the flow path cross-sectional areas of the squeezing flow paths 28 were changed by changing the diameter and number of the squeezing flow paths 28 in the pressure drop adding device 100 composed of the solid plate member including the squeezing flow paths 28 as shown in the fifth embodiment.

Any of mixing and extrusion equipment 2 used in these experimental examples and comparative examples was such that a pressure drop adding device 100 having the outer periphery supported by a pressure drop adding device supporting body 21b as illustrated in FIGS. 8 and 9A-9B to 11A-11B was mounted in the polymer flow duct 5 for conveying a polymer kneaded compound from a twin-rotor mixer (LCM50) to the strand die 6 via the gear pump 7. The polymer kneaded compound discharged from the twin-rotor mixer was a mixture obtained by mixing 2.3% of carbon black with a high-density polyethylene (density=0.945 g/cm$^3$, melt index=0.08 g/10 min, 190° C., load of 2.16 kg-w: JIS K 7210) as a base material. The high-density polyethylene and carbon black were supplied in a powder form to this mixing and extrusion equipment 2 and the polymer kneaded compound kneaded in the mixing and extrusion equipment 2 was discharged through the polymer flow duct 5.

Table 3 shows how a white spot area ratio and a improvement ratio of the white spot area ratio to be described later changed according to the pressure drop when the pressure drop was changed by changing the diameter of the squeezing flow paths 28 of the pressure drop adding device 100 in five variations; i.e. setting it at 1 mm in Experimental Example 13, 1.15 mm in Experimental Example 15, 1.5 mm in Experimental Example 14 and 2 mm in Comparative Example 6 and Experimental Examples 11 and 12 and no squeezing flow paths 28 in Comparative Example 5 and changing the number of the squeezing flow paths 28 provided in the pressure drop adding device 100 in five variations; i.e. setting it at 0 in Comparative Example 5, 4 in Comparative Example 6 and Experimental Examples 12, 14, six in Experimental Example 15, nine in Experimental Example 11 and sixteen in Experimental Example 13.

TABLE 3

| | Diameter D of Squeezing flow paths [mm] | Number n of Squeezing flow paths | Squeeze ratio of Gel Reduction Device (Pressure drop Adding Device) | Pressure drop (MPaG) Generated in Gel Reduction Device (Pressure drop Adding Device) | White Spot Area Ratio (%) | Improvement Ratio of White Spot Area Ratio (%) |
|---|---|---|---|---|---|---|
| Comp. Example 5 | NONE | NONE | — | — | 0.48 | 0.0 |
| Comp. Example 6 | 2 | 16 | 25 | 5.9 | 0.23 | 52.1 |
| Exp. Example 11 | 2 | 9 | 44 | 8.8 | 0.10 | 79.2 |
| Exp. Example 12 | 2 | 4 | 100 | 14.2 | 0.08 | 83.3 |
| Exp. Example 13 | 1 | 16 | 100 | 17.3 | 0.08 | 83.3 |
| Exp. Example 14 | 1.5 | 4 | 178 | 19.6 | 0.07 | 85.4 |
| Exp. Example 15 | 1.15 | 6 | 202 | 22.6 | 0.07 | 85.4 |

Note that the white spot area ratio is an area ratio indicating a degree of insufficient kneading (i.e. gel is observed or not) in the polymer kneaded compound extruded from the strand die 6. That is, with the composition described above, when there is an insufficiently kneaded area, transparent parts not colored by the carbon black (parts where gel is present) are observed as an area ratio of gel in the extruded polymer kneaded compound.

Thus, if the extruded polymer kneaded compound is cut into thin pieces of about 20 μm using microtoma and how many transparent parts are present in the thin cut pieces is measured, a gel improvement ratio can be evaluated. Note that this measurement of the area ratio is performed with ×200 photo observation by an optical microscope.

Further, the improvement ratio (reduction degree) of the white spot area ratio indicates in percentage how much the white spot area ratio at each pressure drop has been reduced from a basis using the white spot area ratio when the pressure drop of the pressure drop adding device is 0 MPaG, in other words, the white spot area ratio when the pressure drop adding device is not used, as the basis (improvement ratio of 0%).

The improvement ratio (reduction degree) of the white spot area is calculated by the following equation:

(Improvement ratio of white spot area)=[(Original white spot area)−(White spot area of the samples)]/(Original white spot area)

Figure 12:
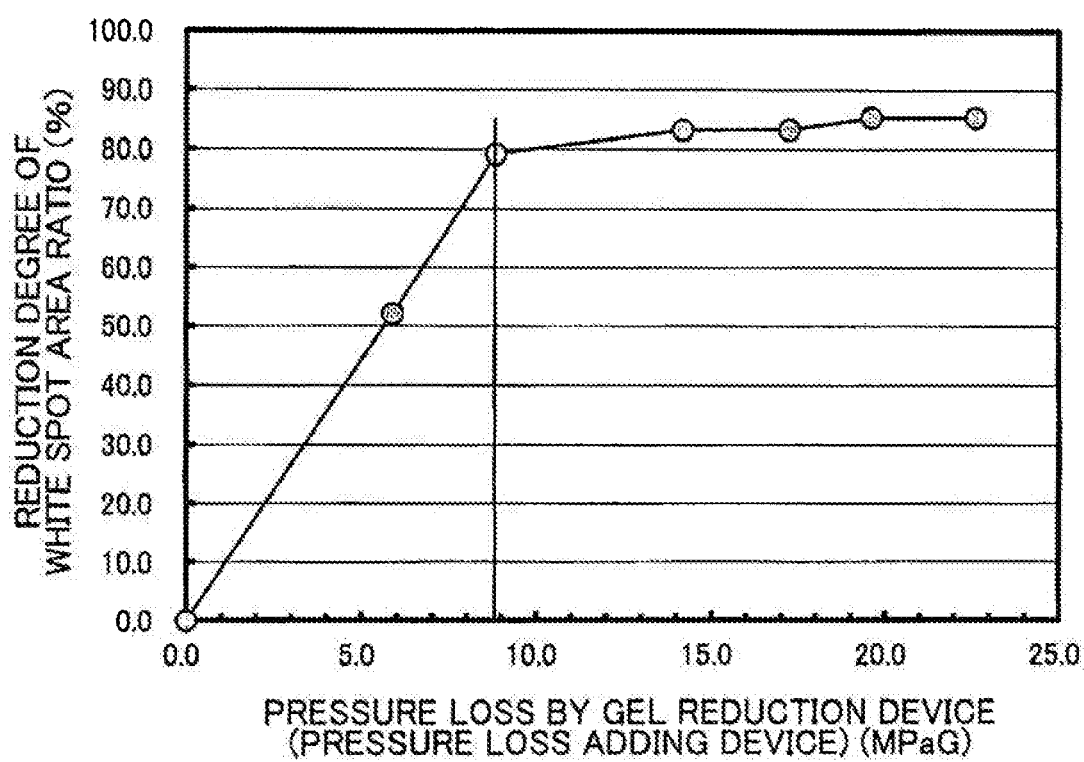
FIG. 12 is a graph showing a relationship between a pressure drop generated by gel reduction device and an improvement ratio of a white spot area ratio.

FIG. 12 is a graph plotting the improvement ratio (reduction degree) of the white spot area ratio in relation to the pressure drop. As shown in FIG. 12, as the pressure drop produced between the upstream side and the downstream side of the pressure drop adding device 100 increases 0 MPaG→5.9 MPaG→8.8 MPaG, the improvement ratio of the white spot area ratio also increases 0%→52.1%→79.2%. In this way, the white spot area ratio also gradually decreases according to the pressure drop.

However, even if the pressure drop by the pressure drop adding device is increased beyond 8.8 MPaG, the improvement ratio of the white spot area ratio is 83.3% at 14.2 MPaG and 85.4% at 19.6 MPaG, i.e. kept at an 80%-plus-something level and does not increase any further than this level. That is, if a pressure drop of 8.8 MPaG or higher can be applied to a resin being kneaded by providing the pressure drop adding device 100, a polymer kneaded compound with a stable and high improvement ratio of the white spot area ratio can be obtained. Particularly, if the pressure drop exceeds 10 MPaG, the improvement ratio of the white spot area ratio is stabilized at or above 80%, wherefore it is preferable to set the pressure drop to or above 10 MPaG.

Note that it is not preferable to set an excessively high pressure drop for protection of an extruder from a mechanical point of view. For example, in the case of extruding a polymer kneaded compound, which is an HDPE (melt index=0.01 to 10/10 min, 190° C., 2.16 kg-w, density=0.930 to 0.970 g/cm$^3$) in the above mixing and extrusion equipment 2, a limit of a pressure is about 35 MPaG due to the mechanical toughness of the equipment. If 10 MPaG, which is necessary to extrude a polymer, is subtracted, the limit of additional pressure increase by the pressure drop adding device 100 is about 25 MPaG.

The present invention is not limited to the above respective embodiments and the shapes, structures, materials, combinations and the like of the respective members can be appropriately changed without changing the nature of the invention.

Note that although the mixer is used in the above mixing and extrusion equipment 2, the pressure drop adding device 100 of the present invention may be changed and applied to an extruder or any equipment handling a polymer kneaded compound containing gel other than extruders and mixers.

SUMMARY OF THE AFOREMENTIONED EMBODIMENTS

As described in the above examples, the present invention is directed to a gel reduction device, comprising a gel reduction mechanism provided in a polymer flow duct in which a polymer kneaded compound flows and adapted to reduce gel present in the polymer kneaded compound, wherein the gel reduction mechanism includes at least one or more squeezing flow paths having a flow path cross-sectional area smaller than the polymer flow duct and a squeeze ratio S1/S2 of the squeezing flow path is set to satisfy the following relationship to generate an extensional flow in the kneaded compound flowing in the squeezing flow path:

squeeze ratio $S1/S2$ of the squeezing flow path=25 to 180 where S1: flow path cross-sectional area of the polymer flow duct and S2: sum total of flow path cross-sectional area of the squeezing flow path.

By the above construction, the squeeze ratio of the squeezing flow path is preferably set to be smaller than 180 so as not to produce an excessive pressure drop between an upstream side and a downstream side of the gel reduction mechanism. In this way, the gel reduction device of the present invention can produce a polymer kneaded compound containing few gels with high productivity.

Further, the gel reduction mechanism may include a plate-like member provided to cross the polymer flow duct, and the squeezing flow path may be a circular through hole provided in the plate-like member.

Further, the gel reduction mechanism may include a plurality of gel reduction members arranged while being spaced apart from each other in a laying direction of the polymer flow duct.

By forming the gel reduction mechanism by the plurality of gel reduction members as described above, the polymer kneaded compound can be extended twice or more, wherefore the gel can be more reliably removed.

A squeezing flow path of the gel reduction member provided at an upstream side of the polymer flow duct and that of the gel reduction member provided at a downstream side may not overlap when viewed in the laying direction of the polymer flow duct.

By adopting the above construction, the polymer kneaded compound is extended twice or more and twisted in the polymer flow ducts, wherefore the gel can be more reliably removed.

Preferably, the gel reduction mechanism includes a filter-like member provided to cross the polymer flow duct and the squeezing flow path is a circular through hole provided in the filter-like member.

By adopting the above construction, the squeezing flow path can be easily formed and production cost can be reduced.

A mesh size of the filter-like member is preferably set to 180 μm or finer. If the mesh size of the filter-like member is set to 180 μm or finer in this way, the meshes of the filter-like member become very fine and the filter-like member itself can remove the gel from the polymer kneaded compound.

Further, the gel reduction mechanism may have a multi-layer structure including the filter-like member and supporting mesh members sandwiching the filter-like member from upstream and downstream sides and having a mesh size coarser than the filter-like member.

By this construction, the filter-like member can be reinforced by being sandwiched by two supporting mesh members from the upstream and downstream sides and the gel reduction mechanism can have excellent toughness.

The supporting mesh members may be formed with openings having the same flow path cross-sectional area as the squeezing flow path of the filter-like member and communicating with the squeezing flow path.

A supporting member for supporting the filter-like member from the downstream side may be provided at the downstream side of the gel reduction mechanism and formed with a flow hole which allows the polymer kneaded compound having passed through the gel reduction mechanism to be further extruded toward the downstream side.

The flow hole formed in the supporting member may communicate with the squeezing flow path formed in the gel reduction mechanism when viewed in the laying direction of the polymer flow duct, and the sum total of the flow path cross-sectional area of the flow hole formed in the supporting member may be equal to or larger than the sum total of the flow path cross-sectional area of the squeezing flow path formed in the gel reduction mechanism.

The present invention is also directed to a method for reducing gel present in a polymer kneaded compound flowing in a polymer flow duct, comprising a step of providing a gel reduction mechanism including at least one or more squeezing flow paths having a flow path cross-sectional area smaller than the polymer flow duct, wherein a squeeze ratio S1/S2 of the squeezing flow path is set to satisfy the following relationship to generate an extensional flow in the kneaded compound flowing in the squeezing flow path:

squeeze ratio $S1/S2$ of the squeezing flow path=25 to 180 where S1: flow path cross-sectional area of the polymer flow duct and S2: sum total of
flow path cross-sectional area of the squeezing flow path; and
a step of introducing the polymer kneaded compound to the squeezing flow path.

According to the above gel reduction method of the present invention, a polymer kneaded compound containing few gels can be produced with high productivity.

As another embodiment, the present invention is further directed to a method for reducing gel present in a polymer kneaded compound flowing in a polymer flow duct, comprising a step of constantly applying a pressure drop of 8.8 MPaG or higher to a kneaded resin containing gel at an intermediate position of the polymer flow duct in which the resin flows, thereby reducing the gel in the polymer.

According to the above gel reduction method of the present invention, a polymer kneaded compound containing few gels can be produced with high productivity.

As another embodiment, the present invention is further directed to a method for reducing gel present in a polymer kneaded compound flowing in a polymer flow duct, comprising a step of providing a pressure drop adding device for generating a predetermined pressure drop in a kneaded polymer containing gels at an intermediate position of the polymer flow duct in which the resin flows, wherein the gel in the resin is reduced by constantly applying a pressure drop of 8.8 MPaG or higher to the resin by the pressure drop adding device.

According to the above gel reduction method of the present invention, a polymer kneaded compound containing few gels can be produced with high productivity.

Note that, in the above embodiment, the pressure drop to be applied to the resin is preferably set at 25.0 MPaG or lower.

It is not preferable to set an excessively high pressure drop for protection of an extruder from a mechanical point of view. For example, in the case of extruding a polymer kneaded compound, which is an HDPE (melt index=0.01 to 10/10 min, 190° C., 2.16 kg-w, density=0.930 to 0.970 g/cm$^3$) in the above mixing and extrusion equipment 2, a limit of a pressure is about 35 MPaG due to the toughness of the equipment. If 10 MPaG, which is necessary to extrude a polymer, is subtracted, a reasonable limit of additional pressure increase by the pressure drop adding device 100 is about 25 MPaG.

Note that the resin is preferably an HDPE having a melt index of 0.01 to 10 g/10 min when being heated to 190° C., with 2.16 kg load.

As still another embodiment, the present invention is directed to a gel reduction device for reducing gel present in a polymer kneaded compound flowing in a polymer flow duct, comprising a pressure drop adding device for generating a predetermined pressure drop in a kneaded resin containing gel at an intermediate position of the polymer flow duct in which the polymer is flowing, wherein a pressure drop of 8.8 MPaG or higher is constantly applied to the polymer by the pressure drop adding device to reduce the gel in the polymer.

According to the above gel reduction method of the present invention, a polymer kneaded compound containing few gels can be produced with high productivity.

In the above embodiment, the pressure drop applied to the resin is preferably set at 25.0 MPaG or lower.

What is claimed is:

1. A method for reducing gel present in a polymer kneaded compound, the method comprising:
    providing a polymer flow duct having an upstream end which is connected with a barrel through which a mixing rotor is provided and a downstream end which is attached with a die,
    a step of allowing the polymer kneaded compound into the polymer flow duct from the barrel through the upstream end;
    a step of flowing the polymer kneaded compound to a gel reduction mechanism provided in the polymer flow duct, the gel reduction mechanism including a gel reduction member having an upstream surface and a downstream surface and one or more through holes each defining a squeezing flow path having a flow path cross-sectional area smaller than the polymer flow duct,
    wherein a squeeze ratio S1/S2 of the squeezing flow path is set to satisfy the following relationship to generate an extensional flow in the kneaded compound flowing in the squeezing flow path:
    squeeze ratio S1/S2 of the squeezing flow path=25 to 177.8
    where S1 is a flow path cross-sectional area of the polymer flow duct and S2 is a sum total of flow path cross-sectional area of the squeezing flow path;
    a step of introducing a flowing mass of the polymer kneaded compound having flowed from the upstream end to the squeezing flow path from the upstream surface under a predetermined pressure difference between an upstream side of the squeezing flow path and a downstream side of the squeezing flow path; and a step of flowing the polymer kneaded compound having flowed from the squeezing flow path to the die to outflow the polymer kneaded compound having a reduced gel through the die.

2. The method according to claim 1, wherein the predetermined pressure difference is 8.8 MPaG or higher.

3. The method according to claim 2, wherein the predetermined pressure difference is 25.0 MPaG or lower.

4. The method according to claim 1, wherein the polymer kneaded compound is an HDPE having a melt index of 0.01 to 10 g/10 min when being heated to 190° C. with a 2.16 Kg load.

* * * * *